(12) United States Patent
Henry (10) Patent No.: US 9,193,370 B2
(45) Date of Patent: Nov. 24, 2015

(54) BRAKE SYSTEM FOR A STROLLER (75) Inventor: Gilles Henry, Boulogne-Billancourt (FR)

(73) Assignee: BABYZEN, Venelles (FR)

( * ) Notice: Subject to any disclaimer, the term of this patent is extended or adjusted under 35 U.S.C. 154(b) by 225 days.

(21) Appl. No.: 13/700,486

(22) PCT Filed: May 28, 2010

(86) PCT No.: PCT/FR2010/000403
§ 371 (c)(1),
(2), (4) Date: Jan. 11, 2013

(87) PCT Pub. No.: WO2011/148062
PCT Pub. Date: Dec. 1, 2011

(65) Prior Publication Data
US 2013/0112509 A1    May 9, 2013

(51) Int. Cl.
*B62B 5/04* (2006.01)
*B62B 9/08* (2006.01)

(52) U.S. Cl.
CPC . *B62B 5/04* (2013.01); *B62B 9/082* (2013.01); *B62B 9/087* (2013.01); *B62B 5/0433* (2013.01); *B62B 5/0461* (2013.01)

(58) Field of Classification Search
CPC .... B62B 5/0433; B62B 5/0461; B62B 9/087; B62B 9/082
USPC .................................. 188/20, 31, 19
See application file for complete search history.

(56) References Cited

U.S. PATENT DOCUMENTS

| | | | |
|---|---|---|---|
| 4,953,667 A * | 9/1990 | Bigo | 188/31 |
| 5,373,917 A | 12/1994 | Kamman | |
| 5,765,665 A | 6/1998 | Cheng et al. | |
| 6,378,663 B1 * | 4/2002 | Lee | 188/2 F |
| 2006/0196736 A1 * | 9/2006 | Chen | 188/19 |
| 2007/0051565 A1 * | 3/2007 | Chen | 188/19 |
| 2008/0073878 A1 | 3/2008 | Li | |
| 2012/0031714 A1 * | 2/2012 | Chen et al. | 188/69 |

FOREIGN PATENT DOCUMENTS

| | | |
|---|---|---|
| DE | 42 26 090 A1 | 2/1994 |
| GB | 2 254 118 A | 9/1992 |
| GB | 2 283 791 A | 5/1995 |
| GB | 2 351 131 A | 12/2000 |

OTHER PUBLICATIONS

International Search Report issued in PCT/FR2010/000403 mailed Mar. 17, 2011 (4 pages).
Written Opinion issued in PCT/FR2010/000403 mail Mar. 27, 2011 (8 pages).

* cited by examiner

*Primary Examiner* — Xuan Lan Nguyen
(74) *Attorney, Agent, or Firm* — Osha Liang LLP (57) ABSTRACT

A brake system for a stroller including at least first and second rear legs, each fitted with a wheel, is disclosed. The brake system includes a first and a second blocking element, slidably mounted respectively on the first and the second legs, between a blocking position and a disengaged position. An operating element, moveable from a high to a low position is employed for displacing the first blocking element from its disengaged position to its blocking position, and conversely, moveable from its low position to its high position for displacing the first blocking element from its blocking position to its disengaged position. A rotating shaft and movement transmission organs cause the second blocking element to move to its blocking position when the first blocking element does the same, and also cause the second blocking element to move to its disengaged position when the first blocking element does the same.

14 Claims, 5 Drawing Sheets

BRAKE SYSTEM FOR A STROLLER

FIELD OF THE INVENTION

The invention relates to brake systems and to child strollers equipped with such devices.

PRIOR ART

Strollers generally comprise one or two front legs and two rear legs equipped with wheels. In order to comply with safety standards, a brake device suitable for child strollers should act simultaneously on the two rear wheels, and should be engaged or disengaged on such two wheels through one single action.

In the prior art there are many brake devices for strollers. However, the solutions of the prior art are not fully satisfying.

Indeed, some brake devices are based on complex mechanical systems, comprising a large number of parts, as well as return springs. A such device is for example described in document U.S. Pat. No. 5,373,917.

Other devices comprise two pedals, fixed near the axis A of the rear wheels, and fitted with pins, with the purpose of blocking the rotation of the wheels when said pedals are pivoted downwards. However, such devices are awkward, as the blocking elements are engaged between the wheel teeth by rotating, and the pedals are uneasy to lift up for unlocking the brake device, as they are located relatively close to the ground and near the wheels' rotation axle. Such brake device is for example described in document U.S. Pat. No. 5,765,665.

Further other devices comprise a cable, interconnecting the blocking elements, and allowing to simultaneously engage such blocking elements acting on each of the rear wheels. However, cable-based brake devices are difficult to assemble, and their reliability is problematic. An example of such brake device is described in document GB 2 351 131.

Finally, other brake devices (see for example document DE 4 226 090) comprise one or a plurality of pedals or horizontal bars, located between the two rear wheels. However, the dimensions of the pedals or horizontal bars located between the two rear wheels does not allow users to leverage on the crossbar interconnecting these wheels, for example to lift the stroller when getting over an obstacle.

SUMMARY OF THE INVENTION

The invention intends to remedy such inconveniences by proposing a brake device that is reliable, robust, non-bulky, requesting a limited number of parts, free of cables or springs, and easy to use.

For this purpose and according to a first aspect, the invention relates to a brake system for a stroller including at least a first and a second rear legs, each one fitted with at least one wheel, such device comprising:

a first and a second blocking elements, slidably mounted respectively on the first and the second leg, between a wheel blocking position and a disengaged position;

an operating element, movably mounted on the first leg, between a high and a low position, and cooperating with the first blocking element, so that the movement of said operating element from its high position to its low position displaces the first blocking element from its disengaged position to its blocking position, and so that conversely, the movement of said operating element from its low position to its high position displaces the first blocking element from its blocking position to its disengaged position; and movement transmission means, designed in order to simultaneously cause the second blocking element to move to its blocking position when the first blocking element moves to its blocking position, and to simultaneously cause the second blocking element to move to its disengaged position when the first blocking element moves to its disengaged position; said movement transmission means comprising a rotating shaft and movement transmission organs, borne by the blocking elements, in gear with said rotating shaft.

In this way, the brake system is relatively simple, as it uses only a limited number of parts, and does not require any cable or return means, as the transmission is effected by means of a torsion-stiff shaft cooperating directly with the blocking elements, in order to simultaneously lead them towards their disengaged position, or towards their wheel blocking position.

Moreover, the operating means is mounted on a rear leg so that its positioning does not prevent from leveraging on a crossbar connecting the two rear legs.

Finally, the locking and unlocking processes for the brake system are simple, as the operating element can be fixed high enough on the rear leg, so that it is easily accessible, e.g. for lifting it up when disengaging the brake system.

Moreover, the usage of a sliding blocking element cooperating with the operating element allows the positioning of the operating element at a higher distance from the ground and from the wheels' rotation axle, which makes it easier to use.

In one embodiment of the invention, the system comprises a second operating element mounted on the second leg, moveable from a high position to a low position, and cooperating with the second blocking element so that the movement of said second operating element from its high position to its low position displaces the second blocking element from its blocking position to its disengaged position, said movement transmission means being designed to cause simultaneously the first blocking element to move to its disengaged position while the second blocking element moves to its disengaged position.

In this way, this embodiment is particularly simple to use, as it requires only a downward push on the first operating element for locking the brake system, and a downward push on the second operating element for unlocking the brake system.

Advantageously, the first and second operating elements cooperate reversibly, respectively with the first and the second blocking elements, so that the movement of the first blocking element to its disengaged position causes the first operating element to move to its high position, and so that the movement of the second blocking element to its wheel blocking position causes the second operating element to move to its high position.

In a second embodiment, the brake system comprises only a single operating element. As a consequence, this embodiment comprises only a limited number of parts.

In these two embodiments the cinematic chain transmitting the movement is therefore entirely reversible, which notably allows to dispense with return means.

Advantageously, the movement transmission organs are toothed racks cooperating with a toothed tip integral with the shaft.

Advantageously, the blocking elements are slidably mounted inside the rear legs. In this way, the brake system is conveniently integrated within the stroller.

In one embodiment, the operating element is rotatably mounted on the first leg, and bears a pin moveable inside a runner built into the first blocking element.

In a second embodiment, the operating element is rotatably mounted on the first leg, and bears a runner cooperating with a pin located on the first blocking element.

Consequently, the movement transmission between the operating element and the first blocking element is simple and reversible.

Advantageously, each of the wheels is equipped with a notched rim and each of the blocking elements includes a peg designed to fit into a notch of the notched rim, so that it blocks the wheel rotation when the blocking element is in its blocking position. In this way, the blocking elements are simple and reliably ensure the blocking of the turning of the rear wheels.

Advantageously, the blocking elements are mobile bottom-up during their movement towards their wheel blocking position, with the pegs of the blocking elements coming to fit, in blocking position, into a notch of the notched rim.

Advantageously, the rotating shaft is positioned inside a crossbar connecting the first and the second rear legs. In this way, the transmission shaft is hidden and protected from any damage while handling the stroller.

Advantageously, the first and the second blocking elements are identical parts, which notably allows to reduce production costs for the brake system, and to make its assembling easier.

According to a second aspect, the invention relates to a stroller equipped with a locking system according to the first aspect of the invention.

BRIEF DESCRIPTION OF DRAWINGS

Other features and advantages of the present invention will appear more clearly upon reading the following description, in relation to the annexed drawings, in which.

For the sake of clarity, identical or similar elements have been identified with identical reference numerals throughout all figures.

DETAILED DESCRIPTION OF AN EMBODIMENT

A child stroller generally comprises a front wheel carriage including one or two front legs equipped with wheels, and a rear wheel carriage including two rear legs 1, 1', each one equipped with at least one wheel 2, 2'.

Figure 1A:
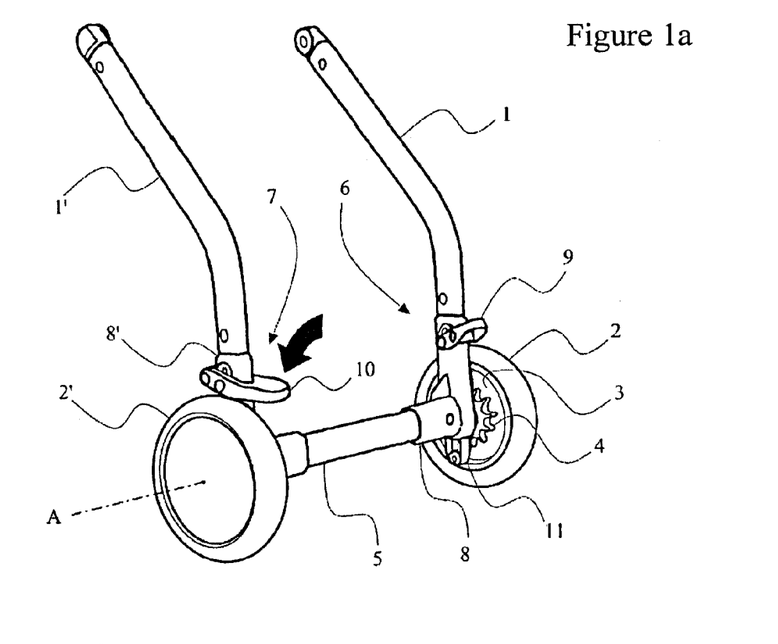
FIGS. 1a and 1b are rear perspective views of the rear carriage of a stroller, equipped with a brake system according to a first embodiment of the invention, respectively in disengaged position and in wheel blocking position.
Figure 1B:
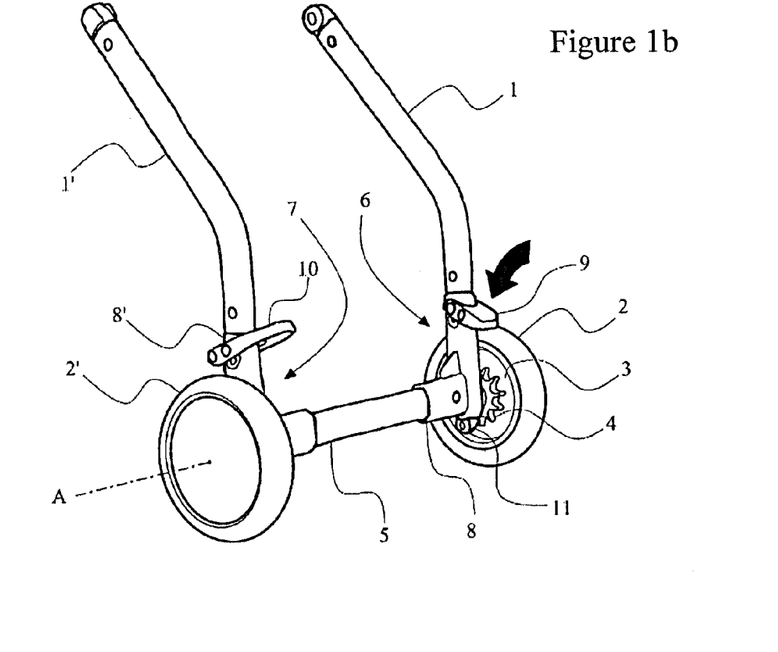

FIGS. 1a and 1b illustrate the general functioning of a brake system according to a first embodiment of the invention, representing the rear carriage of a child stroller, equipped with such system, shown in rear perspective.

The rear carriage of the stroller comprises a right rear leg 1 and a left rear leg 1'. Each one of the legs 1, 1' is equipped with a wheel 2, 2' mobile in rotation about axis A. The wheels 2, 2' are each equipped with a notched rim 3, 3', intended to cooperate with blocking element 11, 11', when such blocking element 11, 11' is in blocking position, in order to prevent the wheel 2, 2' from turning.

In the depicted embodiment, the rear legs 1, 1' comprise at their lower end connection parts 8, 8', such connection blocks 8, 8' being roughly L-shaped, with one first branch extending in line with the lower portion of the leg 1, 1', and a second branch extending horizontally, transversally to the stroller.

A crossbar 5 extends between the two rear legs 1, 1', at the level of the wheels 2, 2', in order to increase the sturdiness of the stroller. The ends of the crossbar 5 are fitted and fixed inside the second branch of the connection parts 8, 8'. For this purpose, the crossbar 5 is for example drilled with holes 31, 31', allowing to fix the crossbar 5 to each of the connection blocks 8, 8', using rivets 32, 32', going through each riveting hole 22, 22' of the connection blocks 8, 8' on one hand, and the holes 31, 31' on the other hand (see FIG. 2).

The brake system comprises a first 9 and a second 10 operating elements, respectively mounted on the first 1 and the second 1' rear legs. The first operating element 9, also referred to as the locking pedal, cooperates with the first blocking element 11 to move said first blocking element 11 from its disengaged position to its blocking position. The second operating element 10, also referred to as the unlocking pedal, cooperates with the second blocking element 11' to move said second blocking element 11' from its blocking position to its disengaged position.

The operating elements 9, 10 are mobile between a high position and a low position. When the brake system according to the invention is in disengaged position (FIG. 1a), the first operating element 9 or locking pedal is in high position, and the second operating element 10 or unlocking pedal is in low position.

For causing the brake system to move from its disengaged position, as depicted in FIG. 1a, to its blocking position for the wheels 2, 2' as depicted in FIG. 1b, the user applies, for example with his foot, a top-down vertical push on the locking pedal 9 (see arrow, FIG. 1b). Conversely, for causing the brake system to move from its blocking position to its disengaged position, the user applies a top-down vertical push on the unlocking pedal 10.

In order to facilitate the distinction between the first 9 and the second 10 operating elements, the two operating elements may notably have different colors.

Figure 2:
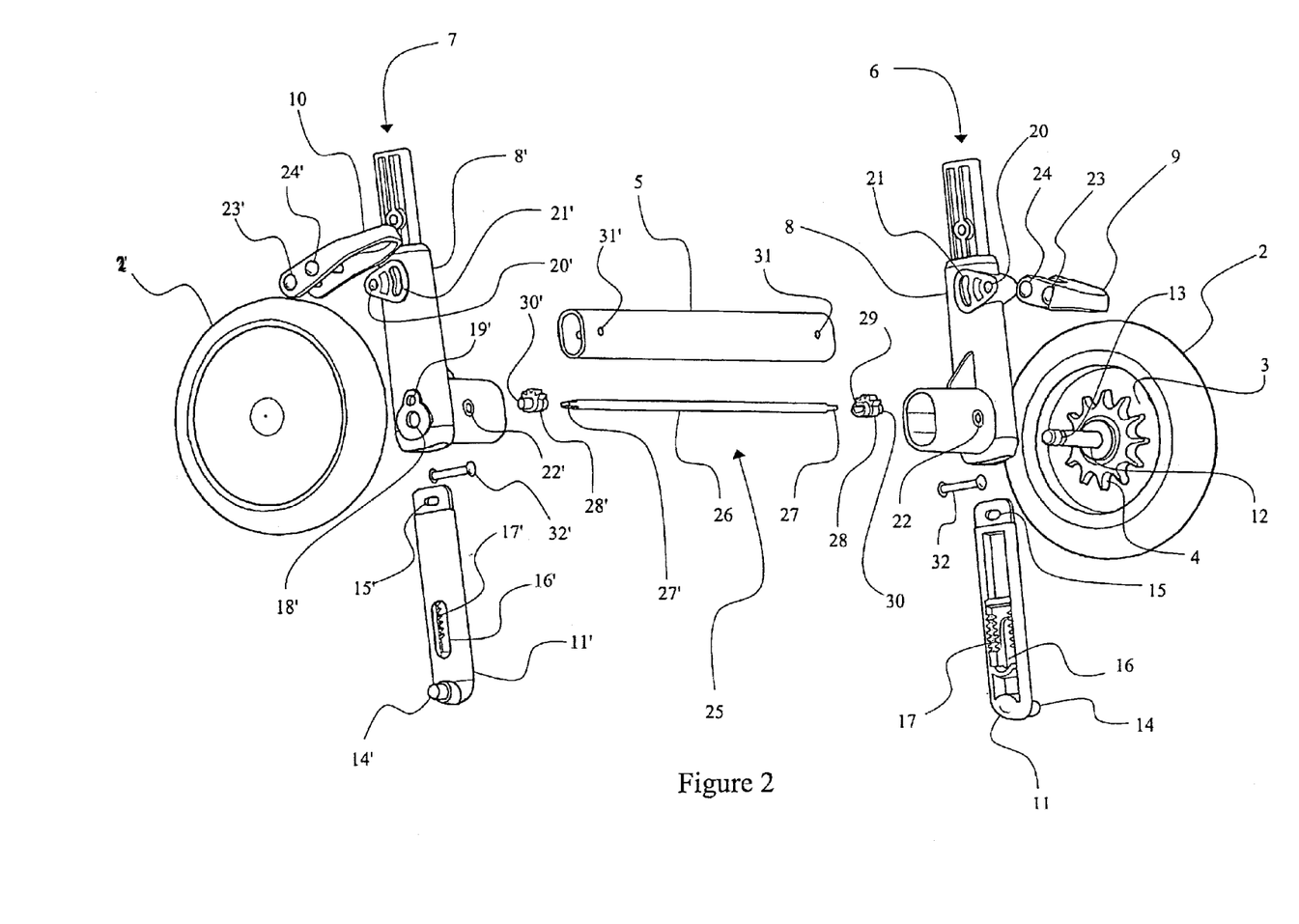
FIG. 2 is an exploded view of a brake system for strollers according to the invention.

FIG. 2 illustrates, in exploded view, all the elements of the brake system according to the depicted embodiment.

The brake system comprises a first 11 and a second 11' blocking elements, mounted respectively on the first 1 and the second 1' legs, and moveable between a wheel blocking position and a disengaged position. The blocking elements 11, 11' are mounted slidably and vertically with respect to the rear legs 1, 1'. Preferably, the connection blocks 8, 8' are molded hollow parts, forming the lower portion of the rear legs 1, 1', inside which the blocking elements 11, 11' are slidably mounted. The connection blocks 8, 8' according to the invention are preferably identical.

The blocking elements 11, 11' comprise a locking peg 14, 14', designed to fit into a notch 4, 4' of the notched rim 3, 3', in order to block the wheels' rotation when the blocking element 11, 11' is in its blocking position. The locking pegs 14, 14' are shaped at the lower end of the blocking elements 11, 11' and expand roughly horizontally outwards. The notches 4, 4' of the notched rim 3, 3' are radially positioned around the axis A of the wheels 2, 2'. The blocking elements 11, 11' move bottom-up while moving from their disengaged position to their wheel blocking position, along an axis crossing the axis of the wheels 2, 2', and perpendicular to the latter. Therefore, the pegs 14, 14' of the blocking elements 11, 11' move radially with respect to the axis A of the wheels 2, 2' and, in blocking position, they come to fit into one of the notches 4, 4'.

In another embodiment of the invention, not depicted, one will obtain a similar result by positioning the locking pegs 14, 14' on an intermediate portion of the blocking elements 11, 11' located above the axis A of the wheels 2, 2', and the notches 4, 4' at the periphery of the rim 3, 3' of the wheels 2, 2'.

Alternatively, in another embodiment, one may also arrange to have the blocking elements 11, 11' moving top-down while they move from their disengaged position to their blocking position, either by keeping the locking pegs 14, 14' at the lower end of the blocking elements 11, 11', with notches 4, 4' positioned at the periphery of the rim 3, 3', or conversely by positioning the locking pegs 14, 14' on an intermediate portion of the blocking elements 11, 11', with notches 4, 4' positioned around the axis A of the wheels 2, 2'. However, the depicted embodiment will be preferred as, in such case, the blocking elements 11, 11' cannot move undesirably to their wheel blocking position, under the influence of gravity, when the stroller is being displaced.

Advantageously, according to the invention, the blocking elements 11, 11' are identical parts, that can be used indifferently as the first or the second blocking element 11, 11'.

The blocking elements 11, 11' are connected via movement transmission means, designed to cause simultaneously the second blocking element 11' to move to its blocking position while the first blocking element 11 moves to its blocking position, and to cause simultaneously the first blocking element 11 to move to its disengaged position while the second blocking element 11' moves to its disengaged position. Therefore, the brake system according to the invention complies with the safety requirements applying to strollers, as it allows the simultaneous blocking of the two wheels 2, 2'.

For that purpose, the movement transmission means 25 comprise a rotating shaft 26, and movement transmission organs 17, 17', borne by the blocking elements 11, 11', in gear with said shaft 26.

The shaft 26 is a torsion-stiff shaft, whose ends are rotatably mounted on the rear legs 1, 1'. The shaft 26 extends roughly parallel to the axis of rotation A of the wheels 2, 2'. The shaft 26 is equipped at both ends with a toothed tip 28, 28', fixed to said shaft 26. For that purpose, each end 27, 27' of the shaft 26 fits into a seating 29, 29' of the tip 28, 28', having a shape complementary to said ends 27, 27' of the shaft 26. For example, the ends 27, 27' of the shaft 26 have a flat shape. The toothed tips 28, 28' each comprise a pin 30, 30' having a cylindrical, notably cylindrical or equivalent shape, freely rotating inside the hole 19, 19' formed within the legs 1, 1', for example within the connection blocks 8, 8', in order to carry the shaft 26, on each side.

The toothed tips 28, 28' present teeth intended to cooperate with toothed racks 17, 17', shaped into the blocking elements 11, 11', for the purpose of transmitting the movement between the blocking elements 11, 11' and the shaft 26. The blocking elements 11, 11' present a window 16, 16', having a roughly oval shape, extending roughly according to the axis of translation of the blocking means, allowing the tips 28, 28' to go through the blocking elements 11, 11'. The toothed racks 17, 17' are shaped on the inner side of the window 16, 16'.

The toothed tips 28, 28' comprise, on a portion of their perimeter, teeth that are in gear with a toothed rack 17, 17'. Therefore, when a blocking element 11, 11' is moved from its disengaged position to its wheel blocking position, the translatory movement of the blocking element 11, 11' leads the rotation of the shaft 26 around its axis. On the opposite side, the rotation of the shaft 26 simultaneously leads the sliding of the other blocking element 11, 11' from its disengaged position to its blocking position.

It should be noted that the cinematic chain transmitting the movement between the blocking elements 11, 11' is entirely reversible, meaning that the moving of any one of the blocking elements 11, 11', towards either one of its positions, leads the moving of the other blocking element 11, 11' towards this position.

Advantageously, the shaft 26 transmitting the movement is placed inside the crossbar 5. Therefore, the transmission shaft 26 remains hidden and protected from any damage when handling the stroller, e.g. when getting over obstacles such as sidewalk borders, or when the user puts his foot on the crossbar 5 in order to facilitate the backward tilting of the stroller.

In the depicted embodiment, the operating elements 9, 10 are rotatably mounted on the rear legs 1, 1'. For that purpose, the operating means 9, 10 are equipped with a rotation axle 23, 23' going through a hole 20, 20' shaped at the lower end of the rear legs 1, 1', in order to allow said operating elements 9, 10 to rotate around said rotation axle 23, 23'. The holes are here directly shaped into the connection parts 8, 8'.

In order to lead the blocking elements 11, 11', the operating elements 9, 10 are equipped with a pin 24, 24', for example consisting in a rivet, going through bores 15, 15' shaped into the blocking elements 11, 11'. The bores 15, 15' extend perpendicularly to the translatory movement of the blocking elements 11, 11'. Therefore, during the rotation of the operating elements 9, 10, the pin 24, 24' applies a pressure on the blocking element 11, 11' in order to ensure the translation of said blocking element 11, 11'. The lower ends of the rear legs 1, 1' have, on both sides, bow-shaped bores 21, 21' guiding the movement of the pin 24, 24'. The bow-shaped bores 21, 21' are here shaped into the connection blocks 8, 8'.

In another embodiment (not depicted), one will obtain the same result if the blocking element 11, 11' is equipped with a pin 24, 24' cooperating with a bore 15, 15' located inside the operating elements 9, 10. In this case, the bores 21, 21' shaped in the connection blocks 8, 8' for guiding this pin 24, 24' have a linear shape.

It should be noted that the transmission of the movement between the operating element 9 and the blocking element 11 is also reversible, meaning that the movement of the operating element 9 from its high position to its low position leads the blocking element 11 to move from its disengaged position to its wheel blocking position on one hand, and that the movement of the blocking element 11 from its wheel blocking position to its disengaged position leads the operating element 9 to move from its low position to its high position on the other hand. Similarly, the transmission of the movement between the operating element 10 and the blocking element 11' is reversible, meaning that the movement of the operating element 10 from its high position to its low position leads the blocking element 11' to move from its wheel blocking position to its disengaged position on one hand, and that the movement of the blocking element 11' from its disengaged position to its wheel blocking position leads the operating element 10 to move from its low position to its high position on the other hand.

It should also be noted that the direction of rotation of the operating elements 9, 10 are opposite. For that purpose, the rotation axles 23, 23' of the pedals are positioned on opposite sides of the plane in which the blocking elements 11, 11' are sliding. As a consequence, if the first operating element or locking pedal 9 turns clockwise to lead the blocking elements 11, 11' to move from their disengaged position to their wheel blocking position, the second operating element 10 will turn counterclockwise during such operation.

Therefore, the first operating element 9 moves from its high position to its low position for displacing the first blocking element 11 from its disengaged position to its blocking position, and the second operating element 10 moves from its high position to its low position for displacing the second blocking element 11 from its blocking position to its disengaged position As a consequence, the user can displace the blocking elements 11, 11' simultaneously towards their blocking position or towards their disengaged position, by applying a top-down push respectively on the locking pedal 9 or the unlocking pedal 10. The operating of the brake system according to the invention is therefore particularly simple, and does not risk to hurt the foot or the shoe of the user.

Moreover, the rear wheels 2, 2' are equipped respectively with an axle 12, 12' mounted perpendicularly to the notched rims 3, 3'. These axles 12, 12' have a toric groove 13, 13' allowing the fixing of the rear wheels 2, 2' at the lower end of the rear legs 1, 1', into the connection blocks 8, 8'. For that purpose, the connection blocks 8, 8' have holes 18, 18', through which the wheel axles can go. Furthermore, in the depicted embodiment, the wheel axles 12, 12' pass through windows 16, 16' inside the blocking elements 11, 11'.

Advantageously, in an embodiment not depicted, the brake system further comprises at least one safety device preventing undesired locking or unlocking. Such device must provide the necessary resistance for maintaining the locking device 6 and the unlocking device 7 alternatively in disengaged position (FIGS. 3a and 4a) and in blocking position (FIGS. 3b and 4b), without impeding the locking and unlocking processes when the user applies a sufficient pressure on the locking pedal 9 or the unlocking pedal 10. As an example, this mechanism may be a catch mechanism, locking up either the blocking means 11, 11', or the pedals 9, 10, relatively to the connection blocks 8, 8'.

Figure 3A:
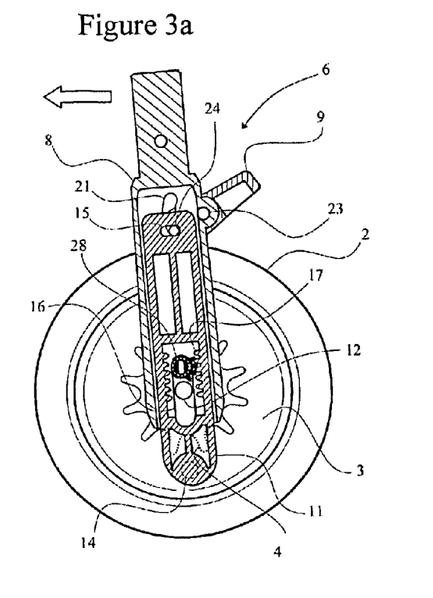
FIGS. 3a and 3b are lateral section views of the first operating means, or locking pedal, and of the first blocking element, respectively in disengaged position and in wheel blocking position.
Figure 3B:
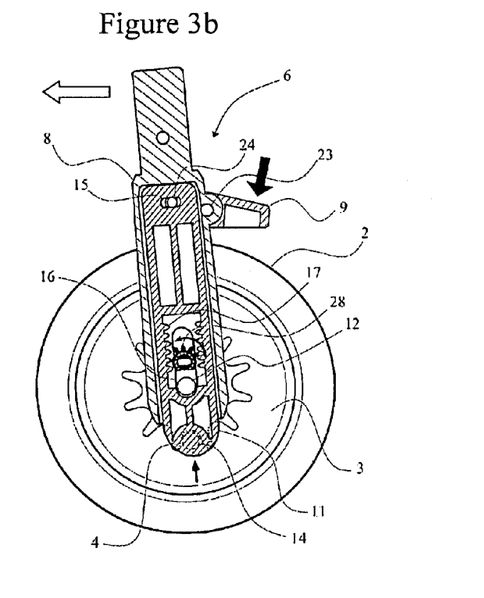
Figure 4A:
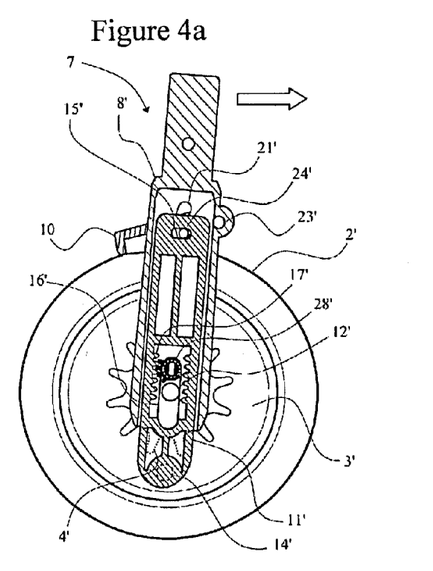
FIGS. 4a and 4b are lateral section views of the second operating means, or unlocking pedal, and of the second blocking element, respectively in disengaged position and in wheel blocking position.
Figure 4B:
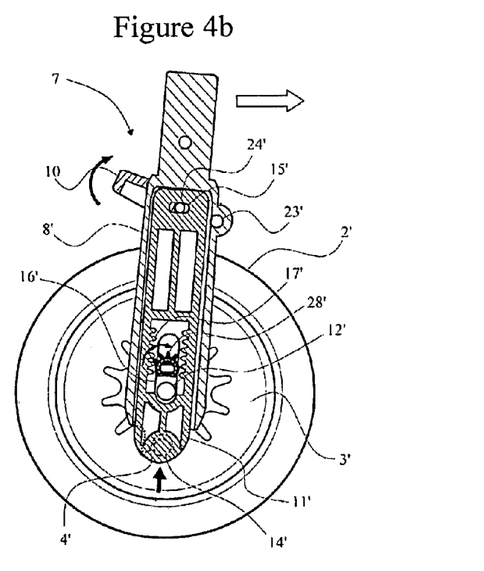
Figure 5:
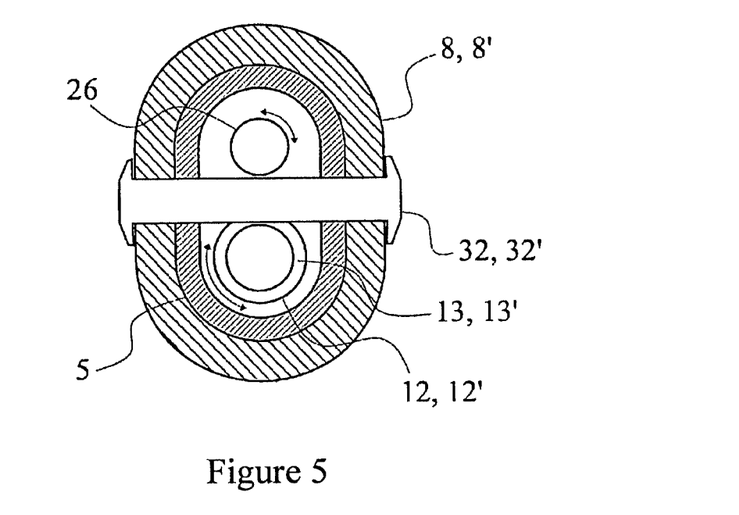
FIG. 5 is a view of the brake system at the junction between the crossbar connecting the rear wheels, and a connection block forming the lower end of a rear leg.

FIGS. 3a and 3b illustrate the detailed functioning of the brake system at the level of the first rear leg 1, whereas FIGS. 4a and 4b illustrate the detailed functioning of the brake system at the level of the second rear leg 1'.

When the brake system is in disengaged position, the locking pedal 9 is in upper, or lifted position, and the blocking means 11 is in lower disengaged position. In this position, the teeth of the toothed tip 28 cooperate with the toothed rack 17 of the blocking means 11.

When the user applies with his foot a top-down vertical push on the locking pedal 9 (FIG. 3b), the locking pedal 9 turns downwards around its rotation axle 23, resulting in the upwards translation of the blocking means 11 up to its wheel blocking position, by sliding inside the connection block 8. The locking peg 14 then comes to fit into a notch 4 of the notched rim 3, so as to block the rotation of the wheel 2. Simultaneously, the translation of the blocking element 11 leads the rotation of the shaft 26, resulting from the cooperation between the toothed tip 28 and the toothed rack 17.

In disengaged position (FIG. 4a), the blocking means 11' is in low position, and consequently the unlocking pedal 10 is in lowered position. In this position, the toothed tip 28' is positioned so as to be in contact with the toothed rack 17'.

As illustrated in FIG. 4b, when the user applies with his foot a top-down vertical push on the locking pedal 9 (FIG. 3b), it produces the rotation of the shaft 26, as explained earlier, leading an upwards translation of the blocking element 11' inside the connection block 8', resulting from the rotation of the toothed tip 28 cooperating with the toothed rack 17'. The locking peg 14' then comes to fit into a notch 4' of the notched rim 3', so as to block the rotation of the wheel 2'. Resulting from the action of the peg 24', the locking pedal 10 tips up around the rotation axle 23'.

Conversely, the unlocking of the brake device is done by applying a top-down vertical push on the unlocking pedal 10, from the position illustrated in FIG. 4b. This action produces the following simultaneous effects:

the unlocking pedal 10 tilts down around the rotation axle 23';

resulting from the action of the pin 24', the blocking element 11' shifts downwards by sliding inside the connection block 8';

the locking peg 14' clears from the notches 4', allowing again the rotation of the wheel 2';

the toothed tip 28' turns around its axis, and leads the rotation of the transmission shaft 26;

resulting from the rotation of the toothed tip 28, the blocking means 11 shifts downwards by sliding inside the connection block 8, therefore clearing the locking peg 14 from the notches 4, allowing again the rotation of the wheel 2; and resulting from the action of the pin 24, the locking pedal 9 tilts up around the rotation axle 23.

At the end of this process, the brake system is therefore back to the position illustrated respectively in FIGS. 3a and 4a.

In addition, the embodiment described here above has the advantage that it can be engaged or disengaged with a single top-down foot push, which prevents from any risk of the user damaging his shoe or hurting his foot during this last process.

Figure 6A:
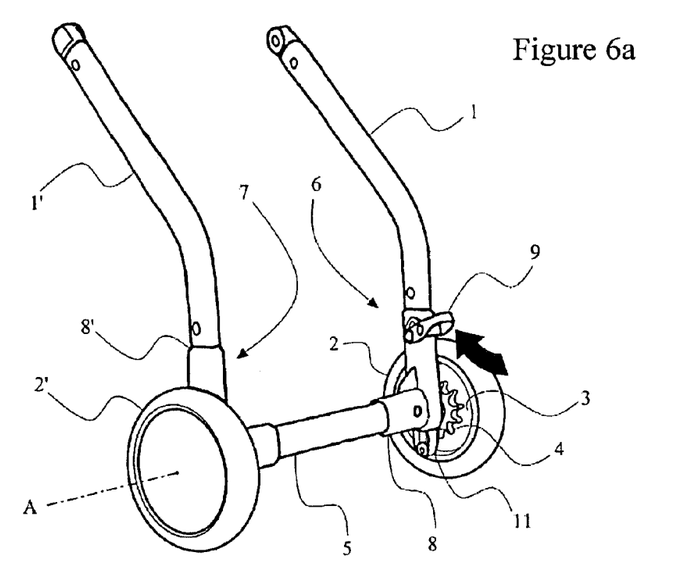
FIGS. 6a and 6b are rear perspective views of the rear carriage of a stroller, equipped with a brake system according to a second embodiment of the invention, respectively in disengaged position and in wheel blocking position.
Figure 6B:
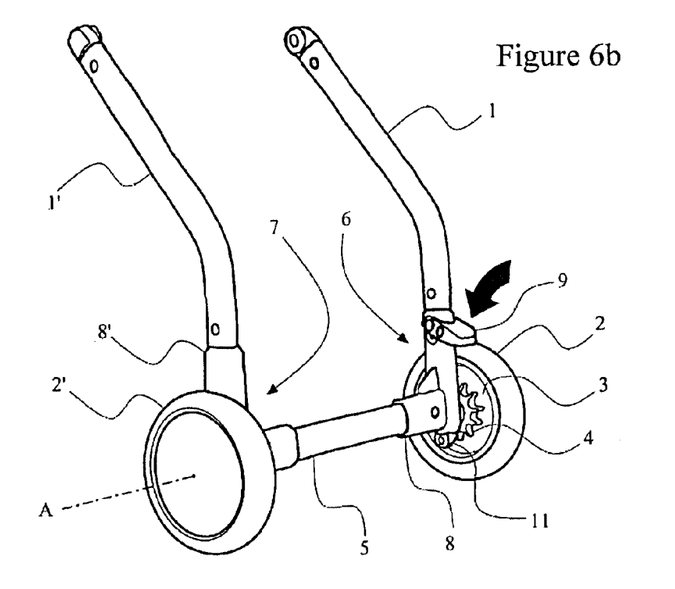

FIGS. 6a and 6b illustrate the general functioning of a brake system according to a second embodiment of the invention, representing the rear carriage of a child stroller, equipped with such system, shown in rear perspective.

This embodiment is identical to the one depicted in FIGS. 1 to 5, except that the second operating element 10 was suppressed. It is therefore the first operating element 9 that is operated both for engaging and for disengaging the brake system. Indeed, the cinematic chain transmitting the movement being still entirely reversible, the movement of the operating element 9 towards its low position (FIG. 6b) leads the two blocking elements 11, 11' to simultaneously move towards their blocking position, and conversely the movement of the operating element 9 towards its high position (FIG. 6a) leads the two blocking elements 11, 11' to simultaneously move towards their disengaged position.

This second embodiment does not allow the unlocking to be operated, like the locking, with a top-down push on a second pedal, but it has the advantage of requesting even a smaller number of parts.

Therefore, thanks to the invention described here above, it is possible to obtain a brake system that is reliable and robust, requesting a limited number of parts and easy to assemble, with no spring or cable, and that does not obstruct the space between the rear legs. Furthermore, this device has the advantage of allowing the positioning of the operating element(s) above the axis A of the rear wheels 2, 2', therefore sufficiently high for being easily accessible by the user's foot.

The invention is described here above as an example. It should be understood that those skilled in the art are liable to bring variations in the embodiment of the invention without leaving the scope of the invention.

It should be noted for example that this type of brake system can be easily adapted to other types of self-carrying carts.

The invention claimed is:

1. A brake system for a stroller including at least a first and a second rear leg, each one fitted with at least one wheel, the brake system comprising:
    a first blocking element and a second blocking element, slidably mounted respectively on the first and the second rear legs, wherein the first and the second blocking elements are slidable between a wheel blocking position and a disengaged position;
    an operating element, movably mounted on the first leg, between a high position and a low position, and cooperating with the first blocking element, so that movement of said operating element from the high position to the low position makes the first blocking element slide from the disengaged position to the blocking position, and conversely, movement of said operating element from the low position to the high position makes the first blocking element slide from the blocking position to the disengaged position; and
    a movement transmission mechanism, for simultaneously causing the second blocking element to move to the blocking position when the first blocking element moves to the blocking position, and to simultaneously cause the second blocking element to move to the disengaged position when the first blocking element moves to the disengaged position, wherein
    said movement transmission mechanism comprises a rotating shaft and movement transmission organs, borne by the blocking elements, in gear with said rotating shaft.

2. The brake system according to claim 1, further comprising:
    a second operating element movably mounted on the second leg between a high position and a low position and cooperating with the second blocking element, so that the movement of said second operating element from the high position to the low position displaces the second blocking element from the blocking position to the disengaged position, said movement transmission mechanism being designed to cause simultaneously the first blocking element to move to the disengaged position while the second blocking element moves to the disengaged position.

3. The brake system according to claim 2, wherein the first and the second operating elements cooperate reversibly, respectively with the first and the second blocking elements, so that the movement of the first blocking element to the disengaged position causes the first operating element to move to the high position, and so that the movement of the second blocking element to the wheel blocking position causes the second operating element to move to the high position.

4. The brake system according to claim 1, wherein the brake system comprises only a single operating element.

5. The brake system according to claim 1, wherein the movement transmission organs are toothed racks cooperating with a toothed tip in gear with the shaft.

6. The brake system according to claim 1, wherein the first and second blocking elements are slidably mounted inside the rear legs.

7. The brake system according to claim 1, wherein the operating element is rotatably mounted on the first leg, and bears a runner cooperating with a pin located on the first blocking element, or bears a pin moveable inside a runner built into the first blocking element.

8. The brake system according to claim 1, wherein each of the wheels is equipped with a notched rim fixed to the wheel, and wherein each of the blocking elements includes a peg that fits into a notch of the notched rim, so that the peg blocks the rotation of the wheel, when the blocking element is in the blocking position.

9. The brake system according to claim 8, wherein the locking pegs are arranged to slide along an axis radial to the axis of the wheels.

10. The brake system according to claim 1, wherein the rotating shaft is positioned inside a crossbar connecting the first and the second rear legs.

11. The brake system according to claim 1, wherein the first and the second blocking elements are identical parts.

12. A stroller equipped with a brake system according to claim 1.

13. The brake system according to claim 1, wherein the operating element is rotatably mounted on the first leg.

14. The brake system according to claim 3, wherein the first operating element is rotatably mounted on the first leg around a first rotation axis, wherein the second operating element is rotatably mounted on the second leg around a second rotation axis, and wherein the first and second rotation axes are positioned on opposite sides of a plane in which the blocking elements slide.

* * * * *